United States Patent
Argumedo et al.

(10) Patent No.: US 8,773,805 B2
(45) Date of Patent: Jul. 8, 2014

(54) TAPE MEDIA LIFE (75) Inventors: Armando Jesus Argumedo, Tucson, AZ (US); Ernest Stewart Gale, Tucson, AZ (US); Reed Alan Hancock, Tucson, AZ (US); Kevin B. Judd, Tucson, AZ (US); Eiji Ogura, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 20 days.

(21) Appl. No.: 13/600,649

(22) Filed: Aug. 31, 2012

(65) Prior Publication Data
US 2014/0063642 A1 Mar. 6, 2014

(51) Int. Cl.
*G11B 15/48* (2006.01)
*G11B 5/584* (2006.01)
*G11B 15/18* (2006.01)
*G11B 27/36* (2006.01)

(52) U.S. Cl.
USPC ......... 360/74.1; 360/77.12; 360/72.3; 360/31

(58) Field of Classification Search
None
See application file for complete search history.

(56) References Cited

U.S. PATENT DOCUMENTS

| | | | | |
|---|---|---|---|---|
| 5,251,077 A * | 10/1993 | Saitoh | ............... | 360/53 |
| 5,386,324 A * | 1/1995 | Fry et al. | ............ | 360/53 |
| 5,436,774 A * | 7/1995 | Nakagawara et al. | ........ | 360/74.4 |
| 6,580,577 B1 * | 6/2003 | Hanagata | .................. | 360/72.3 |
| 7,085,091 B1 | 8/2006 | Kientz | | |
| 7,372,657 B2 | 5/2008 | Gill et al. | | |
| 7,835,103 B2 | 11/2010 | Anderson et al. | | |
| 8,139,311 B2 | 3/2012 | Oishi | | |
| 2010/0072935 A1 | 3/2010 | Aas et al. | | |

OTHER PUBLICATIONS

IPCOM000013545D, Shortening Method of Wrap Change Time by Adjusting Head and Tape Movement Time Dynamically on Tape Drive, Jun. 18, 2003.

* cited by examiner

*Primary Examiner* — K. Wong
(74) *Attorney, Agent, or Firm* — Griffiths & Seaton PLLC (57) ABSTRACT

Tape media life is increased by dynamically controlling a turn around point (TAP) on the tape media for either an end of a tape wrap or a directional change from a first longitudinal position tape section to a second longitudinal position tape section for reducing damage to the tape media caused by debris by monitoring the TAP for all tape media motion and adjusting tape deceleration for maintaining the TAP to be located at the second longitudinal position tape section.

18 Claims, 4 Drawing Sheets

TAPE MEDIA LIFE

BACKGROUND OF THE INVENTION

Field of the Invention

The present invention relates in general to computers, and more particularly to improving the tape media life in a tape drive over the life usage of the tape drive.

In today's society, computer systems are commonplace. Computer systems may be found in the workplace, at home, or at school. Computer systems may include data storage systems, or disk storage systems, to process and store data. Data storage systems, or disk storage systems, are utilized to process and store data. A storage system may include one or more disk drives and tape drives. Tape, such as magnetic tape, provides for physically storing data which may be archived or which may be stored in storage shelves of automated data storage libraries, and accessed when required. As an archival medium, tape often comprises the only copy of the data. In these and other situations, accuracy of the data and the prevention of damage to the tape can be a relatively high priority. However, due to the various processing components and applications, tape media within the computer systems often encounter a worn condition as the tape media approaches an end-of-life.

SUMMARY OF THE DESCRIBED EMBODIMENTS

In one embodiment, a method is provided for increasing tape media life using a processor device. A turn around point (TAP) on the tape media is dynamically controlled for either an end of a tape wrap or directional change from a first longitudinal position tape section to a second longitudinal position tape section for reducing damage to the tape media caused by debris by monitoring the TAP for all tape media motion and adjusting tape deceleration for maintaining the TAP to be located at the second longitudinal position tape section.

In another embodiment, a computer system is provided for increasing tape media life. The computer system includes a computer-readable medium and a processor in operable communication with the computer-readable medium. The processor dynamically controls a turn around point (TAP) on the tape media for one of an end of a tape wrap and directional change from a first longitudinal position tape section to a second longitudinal position tape section for reducing damage to the tape media caused by debris by monitoring the TAP for all tape media motion and adjusting tape deceleration for maintaining the TAP to be located at the second longitudinal position tape section.

In a further embodiment, a computer program product is provided for increasing tape media life. The computer-readable storage medium has computer-readable program code portions stored thereon. The computer-readable program code portions include a first executable portion that dynamically controls a turn around point (TAP) on the tape media for one of an end of a tape wrap and directional change from a first longitudinal position tape section to a second longitudinal position tape section for reducing damage to the tape media caused by debris by monitoring the TAP for all tape media motion and adjusting tape deceleration for maintaining the TAP to be located at the second longitudinal position tape section.

In addition to the foregoing exemplary method embodiment, other exemplary system and computer product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

With increasing demand for faster, more powerful and more efficient ways to store information, optimization of storage technologies is becoming a key challenge, particularly in tape drives. Tape is a known medium for the storage of audio, video, and computer information. The information is typically written to and read from the tape magnetically and/or optically. Such tapes are available spooled on individual reels and in single or dual reel tape cassettes/cartridges. The tape in a single reel tape cartridge must be mechanically threaded through the tape path and spooled onto a take-up reel after insertion into a tape device/drive. The tape path for any type of tape cartridge and tape drive includes a tape head in close proximity to the tape and having one or more transducer elements for writing to and/or reading from the tape. The tape is driven past the tape head by a capstan, or by direct drive of the tape reels. As used herein, the terms "cassette" and "cartridge", and the terms "device" and "drive" are interchangeable. For reliable operation of a tape drive, a tape cartridge and the tape therein must be capable of being accurately aligned to one or more tape heads in the tape drive. Known tape cartridges have shells (i.e. outer materials) manufactured from plastic or other materials which deform easily from mechanical and/or thermal stress. Such stresses may occur during the storage, manual handling, and automated handling of the tape cartridges, including the mounting and demounting of the tape cartridges in a tape drive. In addition, similar materials are used for the internal parts of known tape cartridges. Such materials make accurate alignment of the tape and tape heads difficult, and subject to alteration during aging and handling.

As tape products are developed, the primary goal is to maximize the cost per capacity. Therefore the desire to increase tape media capacity receives high priority during product development. The tape cartridge capacity is a function of linear density, track density, and tape length. The tape length is controlled by the tape thickness. So as products progress from one generation to another, typically the tape thickness decreases. The current thickness of Linear-Tape-Open (LTO) format Gen6 media is about 6.1 micrometer (um), which is about 1/16 the thickness of a typical sheet of paper. As such, it is very fragile and sensitive to stresses.

The stresses that tape media experience may come from changes in tension, temperature, wound packing, debris, etc. It has been observed on tape media (e.g., several LTO generations) that when debris, such as small particles of tape edge debris, is on the surface of the tape, and the tape is then wound into a tape pack, the small particles cause tiny indentations into the media surface, which is known as embossing. As the tape media becomes thinner, the tape becomes more susceptible to the embossing stresses. When this occurs, the embossed region of tape tends to cause a localized, larger separation between the tape head and tape media causing signal loss and signal distortion. One particular signal distortion occurs in the servo signals. The servo signals are necessary to properly position the tape relative to the read/write heads in order to achieve the desired track density. When these embossed regions pass over the servo heads, the servo signal becomes distorted with the appearance of what are called servo spikes, which is when the position error signal (PES) appears to observe a sudden (erroneous) jump in track position.

Moreover, as the tape is written on several wraps (a wrap being a track group recorded on the tape in the physical forward or physical reverse direction), that when the tape switches direction at the end of each wrap a debris dump zone occurs. The debris dump zone is region of tape where the debris, which has accumulated on the head during tape motion, gets transferred from the head to the tape surface. The debris dump zone occurs at or near the point where the tape motion direction changes, which is referred to as a turn around point (TAP). However the debris has been observed to cover several meters of tape near the TAP. Currently, the turn around points for each direction change have been just before a longitudinal position-3 tape section (LP3) and just after longitudinal position-4 tape section (LP4). Embossing has been observed near (both before and after) LP3 and LP4. As such, the servo signal and the data signals have demonstrated undesirable distortion. With the thinner media, it has been observed that after about 10,000 pass across the TAP the distortion becomes severe enough that the tape cartridge is no longer usable. This is about one fourth to one third of the desired life of the media.

Thus, to address this need, in one embodiment, the present invention provides a solution to change the TAP, especially the TAP near the LP3, to a location prior to longitudinal position-2 tape section (LP) whereby the embossed area is moved away from the calibration and data areas. And the region from about LP2 to LP4 remains usable for a much larger number of passes or cycles. In other words, as will be described below, during a normal tape drive operation, the drive microcode is modified to change the turn around point from near LP3 to before LP2. Changing the TAP may be performed for both wrap turns and also for all directional changes near the LP3, if needed. The changing occurs by dynamically controlling a turn around point (TAP) on the tape media for one of an end of a tape wrap and directional change from a first longitudinal position tape section to a second longitudinal position tape section for reducing damage to the tape media caused by debris by monitoring the TAP for all tape media motion and adjusting tape deceleration for maintaining the TAP to be located at the second longitudinal position tape section. The second longitudinal position tape section is an area on the tape media outside of a user area on the tape media. The second longitudinal position tape section is an area on the tape media prior to LP2. The tape velocity of the tape media is detected and adjusts a calculation operation for consistently positioning the second longitudinal position tape section (e.g., the TAP just prior to LP2) to be at a consistent location on the tape media. A tape deceleration start location may be adjusted for consistently positioning the second longitudinal position tape section to be at a consistent location on the tape media. The tape debris is dumped only in the second longitudinal position tape section (e.g., the TAP just prior to LP2). A high speed locate operation is preformed on a data area of the tape media after reaching the second longitudinal position tape section by increasing tape velocity for minimizing performance issues, and also the high speed locate operation is performed on the area of the tape media for approaching just prior to LP3 and then decreasing the tape velocity for writing data before and after LP3. (A high speed locate is moving the tape at a high speed to reach a different longitudinal position. A high speed locate may also be referred to as high speed motion.

Figure 1:
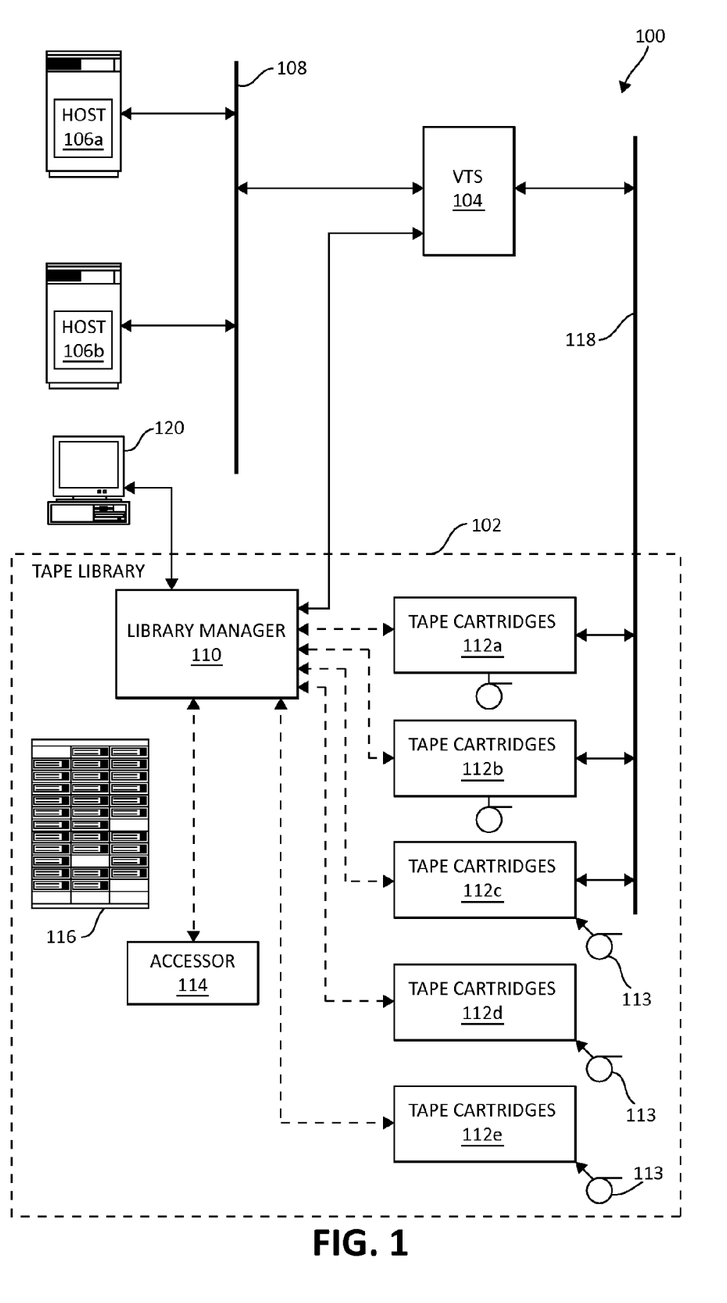
FIG. 1 is a block diagram of an exemplary embodiment of a representative virtual tape system in which aspects of the present invention may be realized.

Turning now to FIG. 1, a block diagram of an exemplary embodiment of a representative virtual tape system 100 in which aspects of the present invention may be realized is depicted. The system 100 includes a tape library 102, at least one VTS 104 (primary cache), and at least one host 106 (shown as 106a and 106b). Each host 106 may be a mainframe computer. Alternatively, the host (users) 106 may be servers or personal computers using a variety of operating systems. The host 106 and the VTS 104 are connected via a storage area network (SAN) 108 or another suitable communications channel, for example, an Enterprise System Connection (ESCON) channel used in an IBM® mainframe computers. The tape library 102 may include a library manager 110, one or more data drive devices that may be tape cartridges 112 (secondary cache shown as 112a-e), an accessor 114, and a plurality of mountable media 116. In one embodiment, the mountable media 116 includes tape cartridges, magnetic disks, optical disks, CDs, DVDs, other devices that can store data and be mounted to a drive unit, and the like. The library manager 110, which includes at least one computing processor, may be interconnected with and may control the actions of the tape cartridges 112 and the accessor 114. The mechanisms of the illustrated embodiments use two types of cache, a primary cache (VTS 104) and a secondary cache in the hierarchical storage management (HSM) system. Such configuration allows the VTS 104 to present to the user or host 106 a file on the disk cache as if it were a virtual tape and the user writes or reads data to or from the file. The file, as the virtual tape generated by the host, is later migrated to a real tape at an appropriate time. However, the mechanisms of the illustrated embodiments may provide for the real tape or tape cartridges to be real or virtual.

In FIG. 1, five tape cartridges 112a, 112b, 112c, 112d, and 112e are shown. The present invention is operable with one or more tape drives 113. The tape drives 113 are configured for assisting with mounting and demounting user data and log data. The tape cartridges 112 may share one single repository of mountable media 116. Alternatively, the tape cartridges 112 may utilize multiple repositories of mountable media 116. The tape cartridges 112 may advantageously be distributed over multiple locations to decrease the probability that multiple tape cartridges 112 will be incapacitated by a disaster in one location.

The interconnections between the library manager 110, the tape cartridges 112, and the accessor 114 are shown as dashed lines to indicate that the library manager 110 transmits and receives control signals, rather than data to be stored or retrieved, to the tape cartridges 112 and/or the accessor 114. Data for storage or retrieval may instead be transmitted directly between the VTS 104 and the tape cartridges 112 via a network 118, which may be a storage area network, (SAN), local area network (LAN), wide area network (WAN), or another suitable type of network, including the Internet or a direct connection between the VTS 104 and the tape cartridges 112 via a point to point or multi-drop buss connection, for example, a Small Computer Storage Interface (SCSI) interface. Alternatively, control signals for tape drives 112 can be transmitted and received through connections between the VTS 104 and the library manager 110 and the VTS 104 and the tape drives 112 via network 118.

The accessor 114 may be a robotic arm or another mechanical device configured to transport a selected mountable media 116 between a storage bin and tape cartridges 112. The accessor 114 typically includes a gripper and a bar code scanner, or a similar read system mounted on the gripper. The bar code scanner is used to read a volume serial number (VOLSER) printed on a cartridge label affixed to the tape cartridge 112. In alternative embodiments, the tape cartridges 112 may be replaced by optical disk drives or other magnetic drives. Similarly, the mountable media 116 and the tape drive 113 may include magnetic media, optical media, or any other removable media corresponding to the type of drive employed. A control console 120 may be connected to the library manager 110. The control console 120 may be a computer in communication with the library manager 110 so that a user can control the operating parameters of the tape library 102 independently of the host 106. Control console 120 may also be a processor device controlling each and every component described herein and specifically; controlling the tape drives 113 for accomplishing the purposes of the invention described herein.

In addition, the described exemplary embodiment may be implemented by various means, such as hardware, software, firmware, or a combination thereof, operational on or otherwise associated with the computing environment. For example, the method 100, as well as the following illustrated exemplary methods may be implemented partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums.

Figure 2:
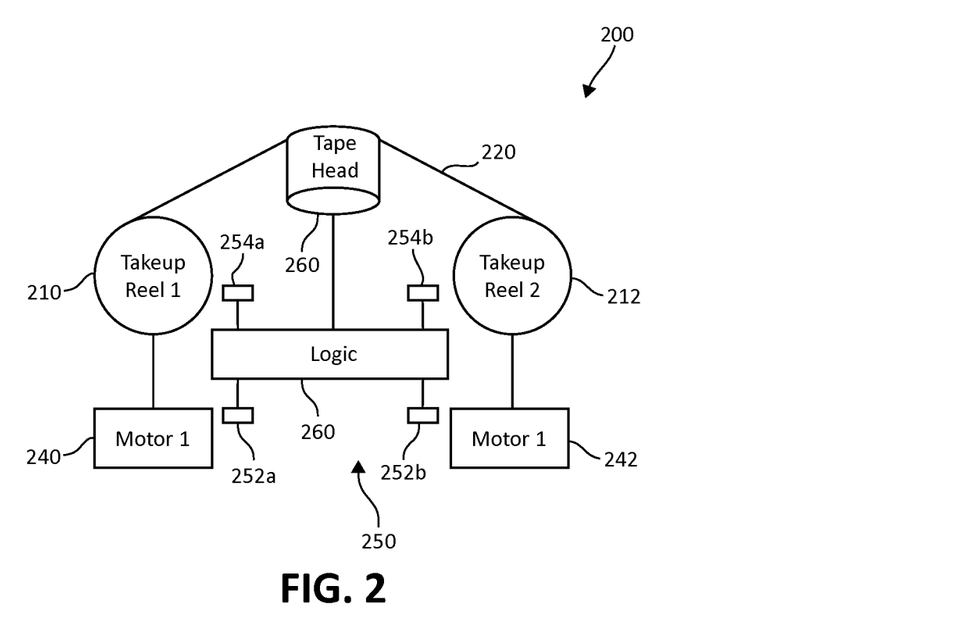
FIG. 2 is a block diagram of an exemplary embodiment of a tape system in which aspects of the present invention may be realized.

FIG. 2 is a block diagram of an exemplary embodiment of a tape system 200 in which aspects of the present invention may be realized. The tape system 200 includes first and second reels 210, 212. Magnetic recording tape 220 is spooled on the first and second reels 210, 212. The magnetic recording tape 220 is routed over a tape head 230 for reading and writing data on the magnetic recording tape 220. Reel motors 240, 242 control the positioning of the magnetic recording tape 220 over the tape head 230. The reel 210, 212, which is supplying tape at a particular time, is often referred to as the "outboard" reel and the reel 210, 212, which is taking up the tape at a particular time, is often referred to as the "inboard" reel. The reel motors 240, 242 are in turn controlled by a control system 250 which includes one or more motor operation sensors 252a, 252b and one or more tape radius sensors 254a, 254b which sense the radius R of the tape 220 at the reel 210, 212 the motor 240, 242 is driving. The motor operation sensors 252a, 252b can include electromotive force (EMF) sensors, for example. A servo system that moves the tape longitudinally is typically very precise, and the servo system bases the longitudinal movement on the instantaneous velocity of the tape. In addition, a calibration routine may be run while there is no tape in the drive. However, it is recognized that, for very long operations on a single tape cartridge, tension control may not be optimal since the motor parameters may have changed due to changes in operating conditions such as temperature variations. In accordance with one aspect of the present description, the control system 250 includes logic 260 for accomplishing the purposes of the present invention.

Figure 3:
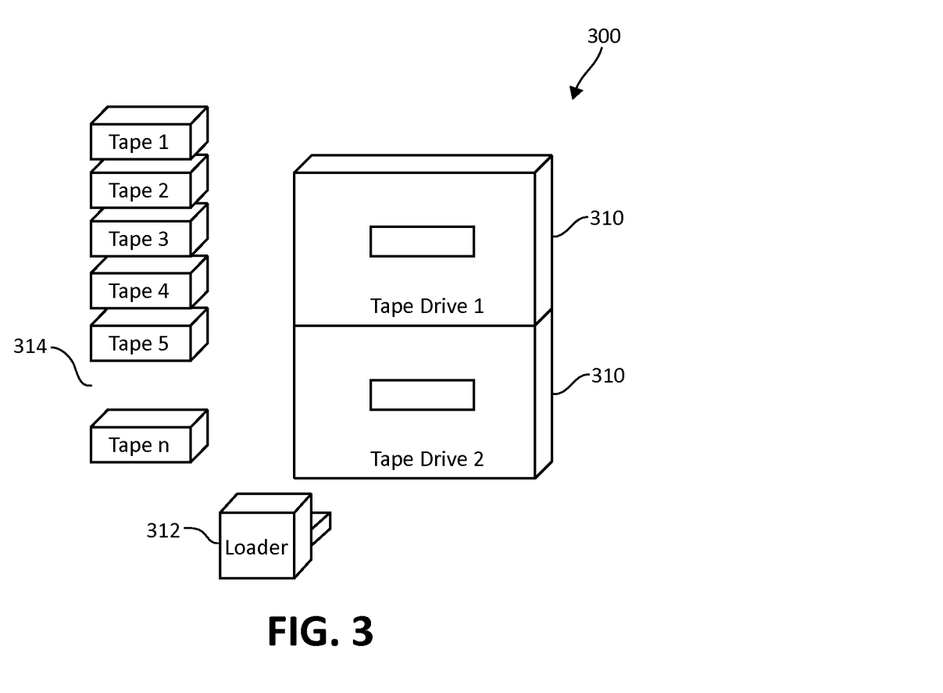
FIG. 3 is an additional block diagram of an exemplary embodiment of a tape library system in which aspects of the present invention may be realized.

FIG. 3 is an additional block diagram of an exemplary embodiment of a tape library system 300 in which aspects of the present invention may be realized. The system 300 further includes a loader 312, and a library of tape cassettes or cartridges 314 that can be accessed by the loader 312 so as to load the tape drive 310 with an appropriately identified tape cassette or cartridge.

Figure 4:
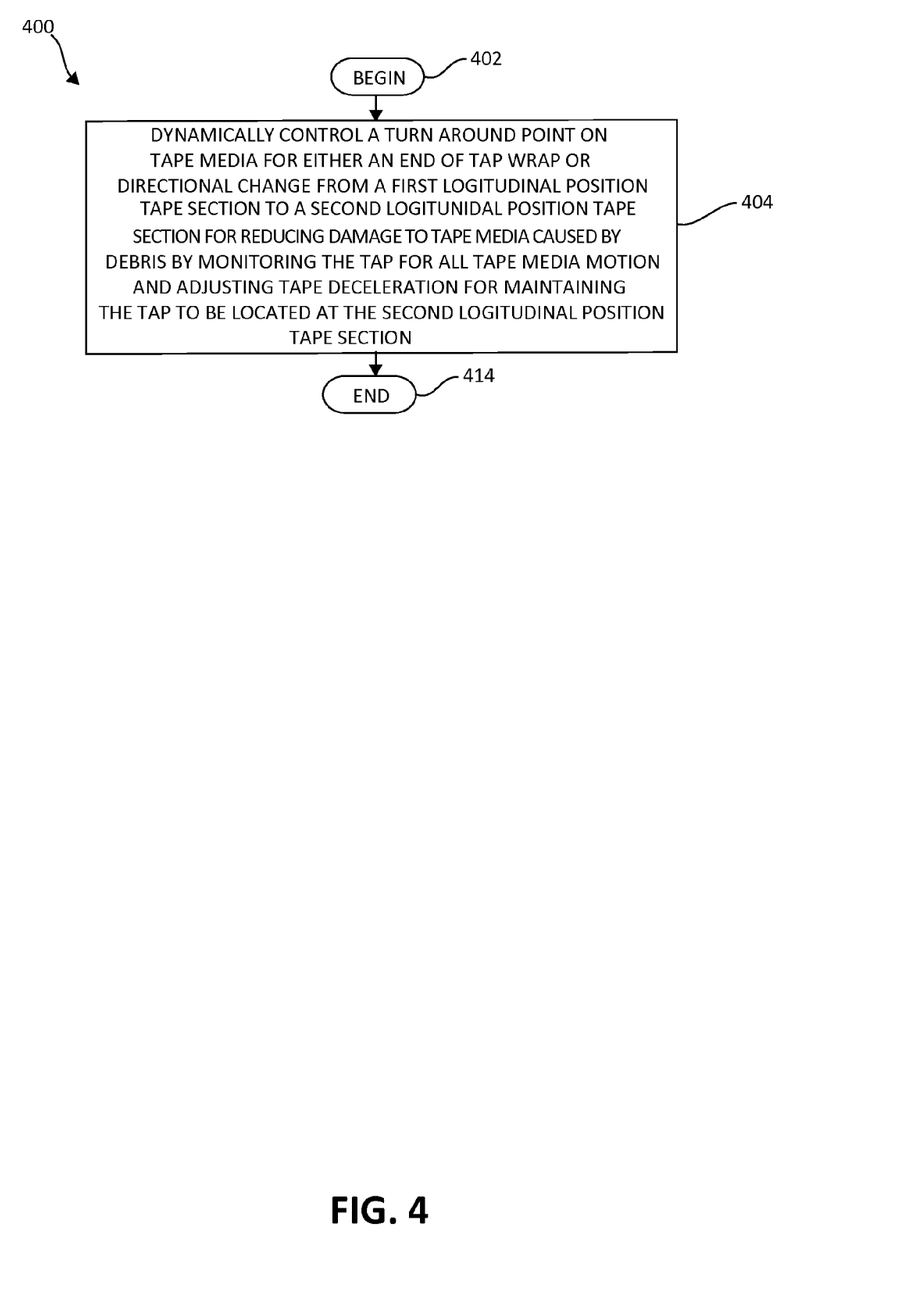
FIG. 4 is a flowchart illustrating an exemplary method for increasing tape media life.

Turning now to FIG. 4, a flowchart illustrating an exemplary method for increasing tape media life is depicted. The method 400 begins (step 402) by dynamically controlling a turn around point (TAP) on the tape media for one of an end of a tape wrap and directional change from a first longitudinal position tape section to a second longitudinal position tape section for reducing damage to the tape media caused by debris by monitoring the TAP for all tape media motion and adjusting tape deceleration for maintaining the TAP to be located at the second longitudinal position tape section (step 404). The second longitudinal position tape section is an area on the tape media outside of a user area on the tape media. The second longitudinal position tape section is an area on the tape media prior to LP2. The method ends (step 414)

Figure 5:
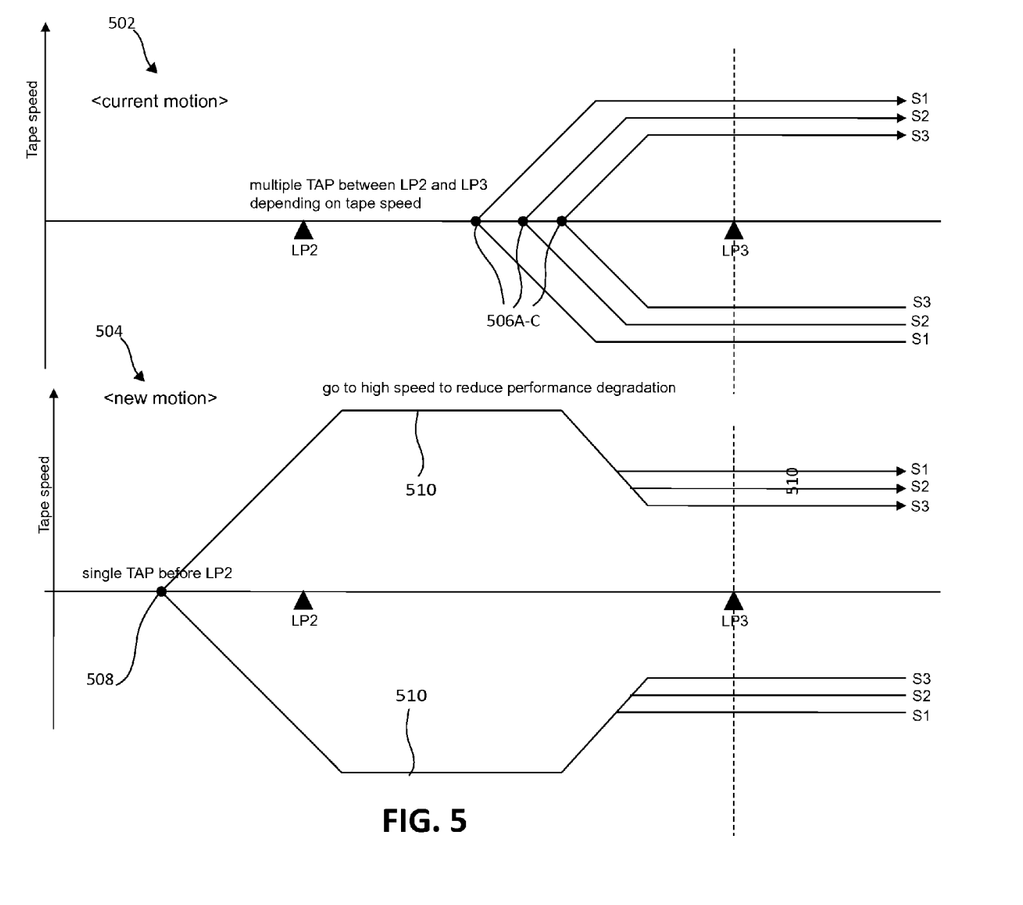
FIG. 5 is a graph illustrating an exemplary diagram for dynamically controlling a turn around point (TAP) on the tape media.

FIG. 5 is a graph illustrating an exemplary diagram for dynamically controlling a turn around point (TAP) on the tape media. Graph 502 and 504 illustrate the tape speed on the Y-axis with the tape being displayed on the X-axis showing the TAP and LP2 and LP3. S1, S2, and S3 represent the tape velocities. The S1, S2, and S3 lines below the X-axis are reverse tape velocities and the S1, S2, and S3 above the X-axis are the forward tape velocities. Previously, when the tape drive reached the end of a wrap the TAP 506a-b (depending on if the tape speed was S1, S2, or S3) was set as a function of the velocity the tape was moving at the time of the wrap turn. Therefore the TAP was not a consistent point on tape (e.g., either 506A, 506B, or 506C), as see in the top half of FIG. 5. In essences there are multiple turn around points (TAP) between LP2 and LP3 depending on tape speed. However, the present invention, illustrated in graph 504, the TAP 508 is moved to before LP2 where there is no issue with damage causing any calibration or data loss issues, and the TAP 508 is at the same point regardless of the tape speed when the end of wrap was reached. This is accomplished by moving at the same high locate speed when the end of wrap is reached at the new TAP 508 just prior to LP2. Also, when the tape direction changes at the TAP, there is also another high speed location 510 to the data area after LP2 to minimize any performance issues. No action is taken beyond the LP4/LP5 position (not shown), because this region of tape is not used for calibration or data, so any damage here will not affect any normal drive functions. Another key factor of the present invention, in addition to moving the location of the TAP 508 to an area on tape that is less sensitive to embossing, but it also detects the tape velocity and adjusts the stopping algorithm to consistently land in the same place on tape as far as the turn around point is concerned. This allows the debris to be "dumped" in the same location on tape, rather than spread around in a more random fashion under the current implementation. To accomplish this, the drive microcode monitors the turn around point for all tape motion near LP3 and if it is targeted to turn around between LP2 and LP3, the microcode adjusts the deceleration start location so that the turn around point is always in the same TAP 508 (e.g., just prior to LP2).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for increasing tape media life using a processor device, a tape media including a longitudinal position-2 (LP-2) tape section, a longitudinal position-3 (LP-3) tape section, and a longitudinal position-4 (LP-4) tape section, wherein one or more of the LP-2, LP-3, and LP-4 tape sections include one or more of calibration and data areas, the method comprising:

controlling a turn around point (TAP) on the tape media for reducing damage to the tape media caused by debris by:
monitoring all tape media motion;
if the tape media is targeted to have a TAP on the tape media between the LP-2 tape section and the LP-3 tape section, designating the TAP to be a first location located prior to the LP-2 tape section;

if an end of a tape wrap of the tape media is reached, designating the TAP to be the first location located prior to the LP-2 tape section; and adjusting tape deceleration for maintaining the TAP to be located at the first location located prior to the LP-2 tape section.

2. The method of claim 1, wherein the first location is located in a longitudinal position tape section on the tape media outside of a user area on the tape media.

3. The method of claim 1, further including, performing each of:

detecting tape velocity of the tape media, and adjusting a calculation operation for consistently positioning the TAP to be consistently at the first location on the tape media.

4. The method of claim 1, further including dumping the debris only in the longitudinal position tape section including the TAP at the first location.

5. The method of claim 1, further including, if the tape media is targeted to have the TAP on the tape media between the LP-2 tape section and the LP-3 tape section, adjusting a tape deceleration start location for consistently positioning the TAP to be consistently at the first location on the tape media.

6. The method of claim 1, further including performing each of:

performing a high speed locate operation on a data area of the tape media after reaching the TAP at the first location by increasing tape velocity for minimizing performance issues, and performing the high speed locate operation on the data area of the tape media for approaching just prior to the LP-3 tape section and then decreasing the tape velocity for writing data before and after the LP-3 tape section.

7. A system for increasing tape media life, the system comprising:

tape media, the tape media including a longitudinal position-2 (LP-2) tape section, a longitudinal position-3 (LP-3) tape section, and a longitudinal position-4 (LP-4) tape section, wherein one or more of the LP-2, LP-3, and LP-4 tape sections include one or more of calibration and data areas;

a tape drive, in communication with the tape media; and a processor device, controlling the tape media and the tape drive, wherein the processor device:

controls a turn around point (TAP) on the tape media for reducing damage to the tape media caused by debris by:

monitoring all tape media motion, if the tape media is targeted to have a TAP on the tape media between the LP-2 tape section and the LP-3 tape section, designating the TAP to be a first location located prior to the LP-2 tape section, if an end of a tape wrap of the tape media is reached, designating the TAP to be the first location located prior to the LP-2 tape section, and adjusting tape deceleration for maintaining the TAP to be located at the first location located prior to the LP-2 tape section.

8. The system of claim 7, wherein the first location is located in an area on the tape media outside of a user area on the tape media.

9. The system of claim 7, wherein the processor device performs each of:

detecting tape velocity of the tape media, and adjusting a calculation operation for consistently positioning the TAP to be consistently at the first location on the tape media.

10. The system of claim 7, wherein the processor device dumps the debris only in the longitudinal position tape section including the TAP at the first location.

11. The system of claim 7, wherein the processor device, if the tape media is targeted to have the TAP on the tape media between the LP-2 tape section and the LP-3 tape section (LP3), adjusts a tape deceleration start location for consistently positioning the first TAP to be consistently at the first location on the tape media.

12. The system of claim 7, wherein the processor device performs each of:

performing a high speed locate operation on a data area of the tape media after reaching the TAP at the first location by increasing tape velocity for minimizing performance issues, and performing the high speed locate operation on the data area of the tape media for approaching just prior to the LP-3 tape section and then decreasing the tape velocity for writing data before and after the LP-3 tape section.

13. A computer program product for increasing tape media life by a processor device, the tape media including a longitudinal position-2 (LP-2) tape section, a longitudinal position-3 (LP-3) tape section, and a longitudinal position-4 (LP-4) tape section, wherein one or more of the LP-2, LP-3, and LP-4 tape sections include one or more of calibration and data areas, the computer program product comprising a non-transitory computer-readable storage medium having computer-readable program code portions stored therein, the computer-readable program code portions comprising:

a first executable portion that controls a turn around point (TAP) on the tape media for reducing damage to the tape media caused by debris by:

monitoring all tape media motion, if the tape media is targeted to have a TAP on the tape media between the LP-2 tape section and the LP-3 tape section, designating the TAP to be a first location located prior to the LP-2 tape section, if an end of a tape wrap of the tape media is reached, designating the TAP to be the first location located prior to the LP-2 tape section, and adjusting tape deceleration for maintaining the TAP to be located at the first location prior to the LP 2 tape section.

14. The computer program product of claim 13, wherein the first location is located in a longitudinal position tape section on the tape media outside of a user area on the tape media.

15. The computer program product of claim 13, further including a second executable portion that performs each of:

detecting tape velocity of the tape media, and adjusting a calculation operation for consistently positioning the TAP to be consistently at the first location on the tape media.

16. The computer program product of claim 13, further including a second executable portion that dumps the debris only in the longitudinal position tape section including the TAP at the first location.

17. The computer program product of claim 13, further including a second executable portion that, if the tape media is targeted to have the TAP on the tape media between the LP-2 tape section and the LP-3 tape section, adjusts a tape deceleration start location for consistently positioning the TAP to be consistently at the first location on the tape media.

18. The computer program product of claim 13, further including a second executable portion that performs each of:

performing a high speed locate operation on a data area of the tape media after reaching the TAP at the first location by increasing tape velocity for minimizing performance issues, and performing the high speed locate operation on the data area of the tape media for approaching just prior to a LP-3 tape section and then decreasing the tape velocity for writing data before and after the LP-3 tape section.

\* \* \* \* \*